(12) United States Patent
Garland et al.

(10) Patent No.: US 10,861,482 B2
(45) Date of Patent: Dec. 8, 2020

(54) FOREIGN LANGUAGE DUB VALIDATION

(71) Applicant: Avid Technology, Inc., Burlington, MA (US)

(72) Inventors: Jacob B. Garland, Peachtree Corners, GA (US); Vedantha G. Hothur, Cumming, GA (US)

(73) Assignee: Avid Technology, Inc., Burlington, MA (US)

( * ) Notice: Subject to any disclaimer, the term of this patent is extended or adjusted under 35 U.S.C. 154(b) by 279 days.

(21) Appl. No.: 16/158,772

(22) Filed: Oct. 12, 2018

(65) Prior Publication Data

US 2020/0118582 A1    Apr. 16, 2020

(51) Int. Cl.
| | | |
|---|---|---|
| *G10L 25/57* | (2013.01) | |
| *G10L 25/45* | (2013.01) | |
| *G10L 15/30* | (2013.01) | |
| *G10L 15/00* | (2013.01) | |

(52) U.S. Cl.
CPC ............ *G10L 25/57* (2013.01); *G10L 15/005* (2013.01); *G10L 15/30* (2013.01); *G10L 25/45* (2013.01)

(58) Field of Classification Search
None
See application file for complete search history.

(56) References Cited

U.S. PATENT DOCUMENTS

| | | | | |
|---|---|---|---|---|
| 6,073,100 | A * | 6/2000 | Goodridge, Jr. | G10L 21/04 704/207 |
| 6,993,081 | B1 * | 1/2006 | Brunheroto | H04N 21/23406 370/487 |
| 9,373,320 | B1 * | 6/2016 | Lyon | G10L 21/0308 |
| 9,510,044 | B1 * | 11/2016 | Pereira | H04N 21/8456 |
| 9,774,747 | B2 * | 9/2017 | Garland | H04M 11/10 |
| 10,304,457 | B2 * | 5/2019 | Suzuki | G10L 15/26 |
| 2005/0281255 | A1 * | 12/2005 | Davies | H04N 21/4307 370/389 |
| 2012/0069131 | A1 * | 3/2012 | Abelow | G06Q 10/067 348/14.01 |
| 2012/0182383 | A1 * | 7/2012 | Kee | H04N 21/4622 348/14.08 |
| 2013/0077805 | A1 * | 3/2013 | Kirsch | G11B 27/105 381/119 |
| 2013/0338805 | A1 * | 12/2013 | Cheng | H04N 21/4305 700/94 |

(Continued)

*Primary Examiner* — Neeraj Sharma
(74) *Attorney, Agent, or Firm* — Oliver Strimpel

(57) ABSTRACT

Temporal regions of a time-based media program that contain spoken dialog in a language that is dubbed from a primary language are identified automatically. A primary language audio track of the media program is compared with an alternate language audio track. Closely similar regions are assumed not to contain dubbed dialog, while the temporal inverse of the similar regions are candidate regions for containing dubbed speech. The candidate regions are provided to a dub validator to facilitate locating each region to be validated without having to play back or search the entire time-based media program. Corresponding regions of the primary and alternate language tracks that are closely similar and that contain voice activity are candidate regions of forced narrative, and the temporal locations of these regions may be used by a validator to facilitate rapid validation of forced narrative in the program.

14 Claims, 4 Drawing Sheets

(56) References Cited

U.S. PATENT DOCUMENTS

| | | | |
|---|---|---|---|
| 2015/0237298 A1* | 8/2015 | Garland | H04H 20/423 348/466 |
| 2016/0027431 A1* | 1/2016 | Kurzweil | G09B 5/062 715/203 |
| 2019/0080704 A1* | 3/2019 | Chebiyyam | G10L 19/022 |

* cited by examiner

FOREIGN LANGUAGE DUB VALIDATION

BACKGROUND

Media publishing is a global industry in which publishers seek to distribute their content in as many territories as possible to maximize the impact of a media production, and to optimize revenues and profitability. The global distribution of media includes traditional broadcast and radio productions as well as new over-the-top (OTT) audio and video productions. With many territories having their own language, customs, and other preferences, the media must be localized before it can be distributed in these regions. A very common component of such localization is the translation and recording of audio dialog as dubbed dialog, which is made available as an option to the consumer as an alternate language track.

When media distributors receive content that contains one or more alternate language dub tracks, the distributor needs to validate the presence, completeness, and correctness of the dub. Current validation methods involve time-consuming manual search for the segments containing the dubbed audio that need to be validated. This impedes media distributors' ability to process, evaluate, and distribute received content. Improved approaches are needed to make the process more efficient, more rapid, and less labor-intensive.

SUMMARY

In general, the methods, systems, and computer program products described herein accelerate and partially automate the validation of alternate language dubs of the dialog in media programs.

In general, in one aspect, a method of locating temporal regions of a time-based media program that contain dubbed speech comprises: receiving the time-based media program, the time-based media program comprising: a first audio track comprising a first plurality of temporal regions, each temporal region of the first plurality of temporal regions including speech spoken in a first language; and an alternate audio track comprising a second plurality of temporal regions, each temporal region of the second plurality of temporal regions including speech spoken in an alternate language dubbed from speech in the first language within a temporally corresponding region of the first audio track; and performing a comparison between the first audio track and the alternate audio track to locate a matching set of temporal regions defined as a set of regions for which audio content of temporally corresponding regions of the first audio track and of the alternate audio track differ by less than a predefined threshold amount; generating a temporal inverse of the matching set of temporal regions, wherein the temporal inverse comprises temporally corresponding regions of the first audio track and of the alternate audio track not included within the matching set of temporal regions; and identifying the temporal regions of the alternate audio track that are included within the temporal inverse as temporal regions of the time-based media program that contain dubbed speech.

Various embodiments include one or more of the following features. The alternate audio track includes at least one of sound effects and music as well as speech. The comparison between the first audio track and the alternate audio track involves at least one of: performing an audio cross-correlation between the first audio track and the alternate audio track; and comparing audio frequency spectra of the first audio track and the alternate audio track. The method includes analyzing one or more of the regions that contain dubbed speech to detect voice activity and using results of the analysis to determine a start time of speech within the one or more regions. The media program includes a region of forced narrative, in which the first audio track and the alternate audio track each comprise speech spoken in the first language. A region of the alternate audio track that is included within the matching set of temporal regions and that contains voice activity is located, and the located temporal region of the alternate audio track is identified as a region containing forced narrative dialog. Automatic validation of a foreign language dub of the alternate language track is performed by: for each region of the temporal inverse regions of the alternate language track, comparing the audio signals of the region with the audio signals to be expected from speech activity in the alternate language; and based on a level of match between the audio signals of the region and the audio signals to be expected from speech activity in the alternate language, determining whether a dub within the region is accurate. Generating a level of confidence that the dub within the region is accurate based on the level of match. If the level of confidence is lower than a threshold level, the region is flagged or otherwise identified as requiring review by a human validator. The threshold level is predetermined or is adjustable, either by a software system running language dub validation software, or by a human validator.

In general, in another aspect, a system comprises a memory for storing computer-readable instructions; and a processor connected to the memory, wherein the processor, when executing the computer-readable instructions, causes the system to perform a method of locating temporal regions of a time-based media program that contain dubbed speech, the method comprising: receiving the time-based media program, the time-based media program comprising: a first audio track comprising a first plurality of temporal regions, each temporal region of the first plurality of temporal regions including speech spoken in a first language; and an alternate audio track comprising a second plurality of temporal regions, each temporal region of the second plurality of temporal regions including speech spoken in a alternate language dubbed from speech in the first language within a temporally corresponding region of the first audio track; and performing a comparison between the first audio track and the alternate audio track to locate a matching set of temporal regions defined as a set of regions for which audio content of temporally corresponding regions of the first audio track and of the alternate audio track differ by less than a threshold amount; generating a temporal inverse of the matching set of temporal regions, wherein the temporal inverse comprises temporally corresponding regions of the first audio track and of the alternate audio track not included within the matching set of temporal regions; and identifying the temporal regions of the alternate audio track that are included within the temporal inverse as temporal regions of the time-based media program that contain dubbed speech.

In general, in yet another aspect, a computer program product comprises: a non-transitory computer-readable medium with computer program instructions encoded thereon, wherein the computer program instructions, when processed by a computer system instruct the computer system to perform a method of locating temporal regions of a time-based media program that contain dubbed speech, the method comprising: receiving the time-based media program, the time-based media program comprising: a first audio track comprising a first plurality of temporal regions, each temporal region of the first plurality of temporal regions including speech spoken in a first language; and an alternate audio track comprising a second plurality of temporal regions, each temporal region of the second plurality of temporal regions including speech spoken in a alternate language dubbed from speech in the first language within a temporally corresponding region of the first audio track; and performing a comparison between the first audio track and the alternate audio track to locate a matching set of temporal regions defined as a set of regions for which audio content of temporally corresponding regions of the first audio track and of the alternate audio track differ by less than a threshold amount; generating a temporal inverse of the matching set of temporal regions, wherein the temporal inverse comprises temporally corresponding regions of the first audio track and of the alternate audio track not included within the matching set of temporal regions; and identifying the temporal regions of the alternate audio track that are included within the temporal inverse as temporal regions of the time-based media program that contain dubbed speech.

DETAILED DESCRIPTION

Figure 1:
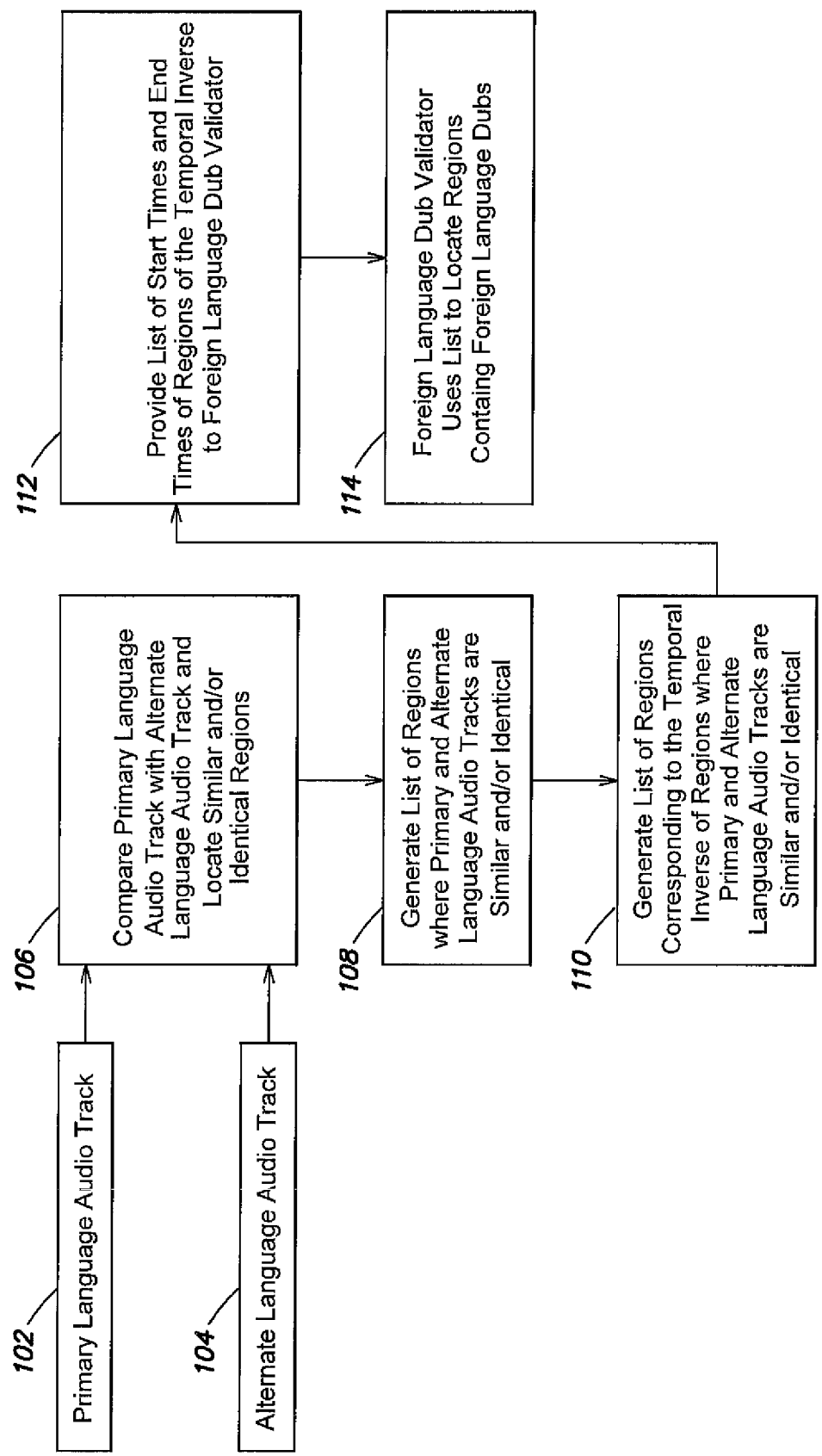
FIG. 1 is a high-level flow diagram of steps involved in the foreign language dub validation process.

Media publishers and distributors receive large quantities of material for evaluation for possible distribution on their media platforms. Once material is approved, it may be necessary to localize the media for use in various territories other than those in which the prospective consumers speak the language of the primary dialog track. In a common case, distributors receive content with an English language dialog and wish to generate one or more alternate dialog tracks in which the English dialog is dubbed into another language. To obtain such an alternate audio dialog, the distributor typically sends the material, including the primary language dialog track, to a dubbing fulfilment partner. The partner obtains voice talent who records the translated dialog in an alternate language. The alternate language track is delivered to the distributor in one of several forms. In one form, it may be fully mixed audio media, in which the dubbed dialog is mixed with the sound effects, music. The mixed audio may be in the form of an un-flattened digital audio workstation file, such as a PRO TOOLS® session in native form. PRO TOOLS is a widely used digital audio workstation, which is a product of Avid® Technology, Inc., Burlington, Mass. Alternatively (or in addition), the dubbed audio may be supplied as a dubbed dialog stem, fully mixed in the 5.1 format. In another context where the target venue is a theater, the dubbed audio may be supplied as a dubbed dialog stem fully mixed in the 7.2 Dolby Atmos® format.

After receiving the dubbed dialog media, and before making the media program with its alternate language track available to consumers, the distributor validates the dub. The validation is performed by a person who locates each portion of the media content containing dubbed dialog and listens to the portions to make sure they are correct and complete from a content standpoint as well as from a technical standpoint. The former involves checking that a dub corresponding to each portion of dialog in the primary language is actually present on the dub audio, and that each portion contains speech that provides a translation in some form of all the spoken content in the corresponding primary language. Technical validation involves checking the dub audio quality, and controlling for defects, such as background sounds.

To perform the dub validation, the validator must locate each temporal region of the media program that contains audio dialog. This step may be time-consuming if it requires the validator to play back the media program to manually identify each dialog portion. Described herein are methods that automate the process of locating the media program regions that contain audio dialog.

The regions of a primary language audio track that do not contain audio dialog are generally duplicated between all the language versions of the track, and thus may be assumed to be similar or identical among the different language version tracks. The methods involve automatically locating such similar or identical regions of the tracks, and then identifying the remaining, dissimilar regions as the regions that are likely to contain the audio dialog. Voice activity detection may then be used to confirm the presence of speech at the same temporal location in the multiple language versions, and to more precisely pinpoint the temporal location of the regions that contain the speech. The methods apply both to mixed-down audio tracks, which may include sound effects, music, and other audio components in addition to spoken dialog, as well as to pure dialog tracks, i.e., tracks that contain audio dialog only without any other audio components.

To locate similar or identical regions of audio tracks corresponding to different language versions, the primary language audio track and an alternate language audio track are compared using a similarity measurement technique. Various similarity measurement techniques may be deployed for this purpose. Some techniques involve performing an audio cross-correlation analysis, which may use tools such as those provided by the Nexidia Workbench Software Development Kit, offered by Nexidia, Inc. of Atlanta, Ga. In another technique, audio spectra are generated for samples in each of the tracks and compared to each other.

The determination as to whether a particular region of the primary language track is similar to a temporally corresponding region of an alternate language track may involve setting a threshold degree of correlation between the tracks. The threshold may be a fixed preset value or may be set as a default value which can be adjusted up or down by a user. In certain embodiments the threshold degree of the normalized correlation (ranging from −1.0 to +1.0) is set at 0.85, such that regions having a higher normalized correlation are deemed to be the same, and regions having a lower normalized correlation are deemed to be different. If the primary language and alternate language audio dialog tracks that are being compared contain dialog only, i.e., they are not mixed with sound effects and/or music, the non-dialog portions may be expected to be silent or contain low amplitude noise or other defects. A different threshold values may be used in this case, as compared to the case where mixed down tracks are compared.

Once the non-dialog regions have been identified, a temporal inverse is created composed of the temporal regions of the media program where the two audio sources are different from each other. These regions may be assumed to contain the dialog portions of the audio track. The system then generates a list of the start and end times of the identified regions of the media program that contain dubbed audio dialog. The list may be output in the form of a text or JSON file containing pairs of start and end times for corresponding speech segments in each of the tracks. The list is provided to a system being used by a dub validator and enables the dub validator to skip directly from one dialog-containing portion to the next when performing dub validation. An initial pass that simply validates the presence of a segment of spoken foreign language dialog corresponding to each segment of dialog in the primary language may be performed by an automated speech detection system with sufficient information about the alternate language to be able to identify the presence of a segment of speech spoken in the alternate language. More detailed validation and checking that the language content of the primary language is adequately translated into the alternate language and dubbed on the alternate language track is generally performed by a human validator who is familiar with both the primary language and the alternate language.

FIG. 1 is a high-level flow diagram of steps involved in the foreign language dub validation process. Primary language audio track 102 and alternate language audio track 104 are provided to an application that performs comparison step 106 by comparing the tracks to each other and measuring the degree of similarity between the audio tracks. The similarity measurement is between the audio signal at a given temporal location of the primary language track and the audio signal at the given temporal location of the alternate language track. The application locates similar or identical regions of the primary and alternate language audio tracks. In step 108, the application generates a list of temporal locations, e.g., a start time and an end time, for each of the temporal regions for which the primary language audio track differs from the alternate language audio track by less than a threshold amount. A list of the regions corresponding to the temporal inverse of the similar and/or identical regions of the primary and alternate language audio tracks is then generated (step 110). The temporal inverse regions are the candidate regions for containing foreign language dub segments. The temporal inverse region list is provided to the foreign language dub validator 112. The foreign language dub validator then uses this list to rapidly locate regions of the media program that contain foreign language dubs (step 114).

Figure 2:
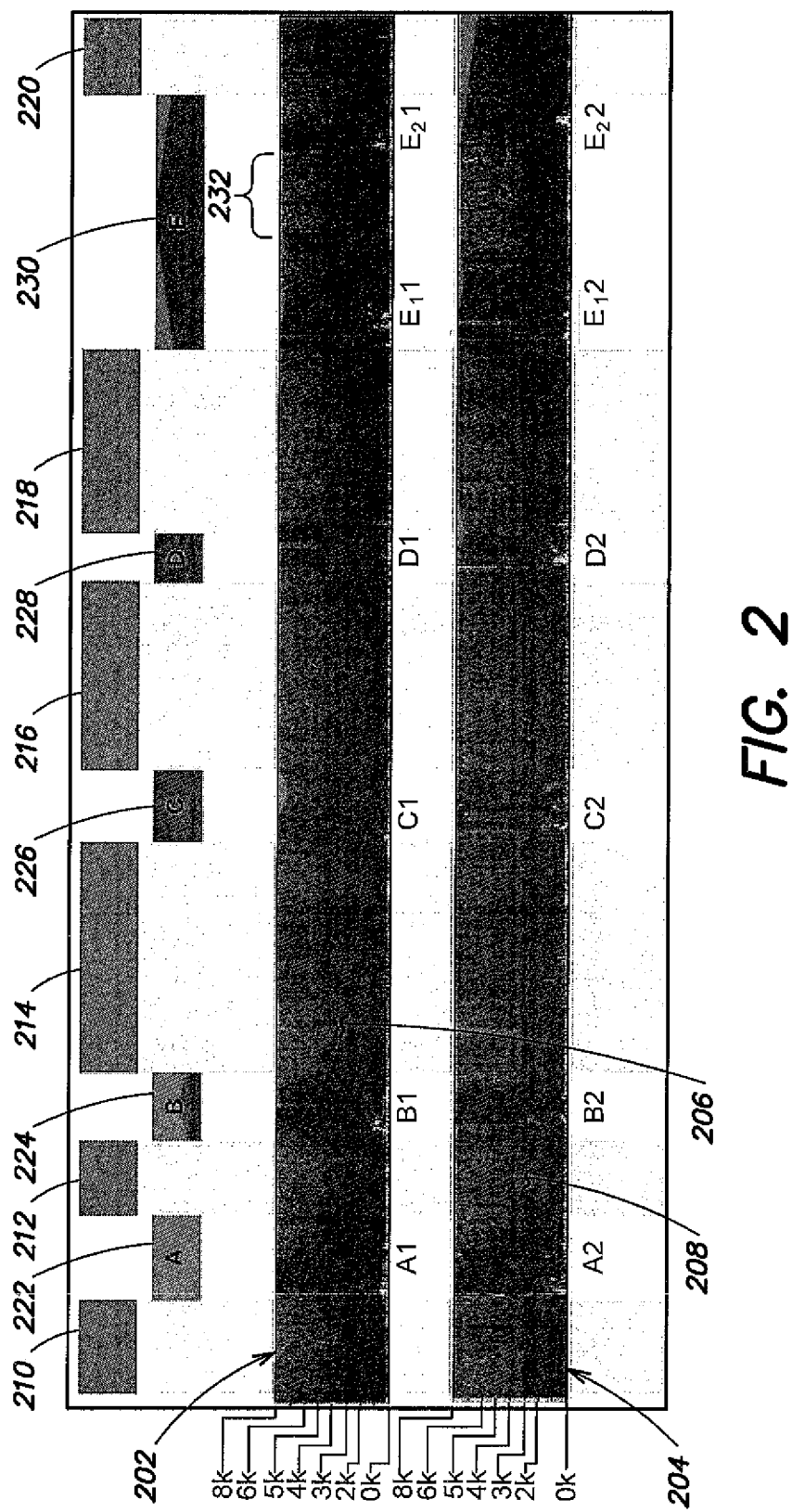
FIG. 2 is a diagrammatic illustration of a primary language audio track and an alternate language audio track that include regions that are similar or identical.

FIG. 2 illustrates primary language audio track 202 and alternate language audio track 204 in a conventional timeline format, with time increasing to the right along a horizontal axis, i.e., with earlier temporal locations within a track to the left, and later temporal locations within a track to the right. Within the depiction of each track, graphical waveforms 206 and 208 are shown to provide a diagrammatic illustration of the audio signal within each track. Using the methods described above, the regions for which the primary track and the secondary track are similar or identical are identified. These regions are highlighted with vertical bands 210, 212, 214, 216, 218, and 220. The temporal inverse of the similar or identical regions include regions A, B, C, and D, labeled in the figure with reference numbers 222, 224, 226, and 228 respectively. Within each region of the temporal inverse set of regions, the system may further identify the portions of the region that contain the speech activity. Thus the list output by software that uses the described methods may be in the form of [A Begin, A End, B Begin, B End . . . ] and/or [A1 Begin, A1 End, A2 Begin, A2 End], [B1 Begin, B1 End, B2 Begin, B2 End], . . . , represented in millisecond offsets from the beginning of the media program.

The temporal location and duration of speech in alternate language track 204 may be somewhat different from the location and duration of speech of the corresponding region in primary language audio track 202, as indicated by the position and length of the boxes shown in the figure below each track. Each of the temporally inverse regions A, B, C, D, E has a start time corresponding to the onset of speech in the primary audio track or the alternate audio track, whichever occurs earlier, and has an end time corresponding to the end of speech activity in whichever track ends later. For example, for region A, primary language track 202 includes voice activity indicated by box A1 spanning, e.g., the times 00:10:20 to 00:13:09, and alternate language track 204 includes voice activity indicated by box A2 spanning 00:10:15 to 00:13:06. Thus, region A spans 00:10:15 to 00:13:09. The differences in speech location and duration between the tracks is minor, and may reflect timing choices made by the dub fulfillment partner and/or result from the fact that the time needed to say a given portion of dialog in the primary language may differ from the time to say the translated dialog in the alternate language.

Region E 230 represents a longer region contained within the temporal inverse regions, within which two speech segments $E_1 1/E_1 2$ and $E_2 2/E_2 2$ have been detected. Multiple distinct regions of speech activity may be grouped into a single region for a variety of reasons. First, for speech segments that are relatively close to each other temporally, it may be more time-efficient and provide more context for a validator to review both segments together. Second, if the longer segment contains portions where voice activity occurs in approximately corresponding regions in both audio tracks as well as in portions where voice activity occurs in one of the tracks but not in the other, it is useful for the validator to review the context within the longer segment to evaluate whether a problem exists. Scenarios that might cause this situation include: (i) a segment of voice activity in one of the tracks was edited out either deliberately or in error; (ii) speech in one of the languages is shorter or longer than in the other language, or is best broken up into a different number of discrete segments; and (iii) a portion of speech, music, or effects in the alternate language track has been replaced or eliminated to match regional preferences. In the example illustrated in the figure, primary language track 202 contains additional speech 232 within region E between $E_1 1$ and $E_2 1$, but no speech counterpart was detected in the alternate language track. This reflects an omission of dubbed speech corresponding to speech 232, and this may be automatically flagged for a validator.

To improve temporal precision of dialogue detection, a voice-activity detection process may be run on each segment to determine where the actual speech begins and ends. This addresses inaccuracies that may be caused by non-speech differences between the two tracks, such as background sounds on one or both of the dialog tracks.

Figure 3:
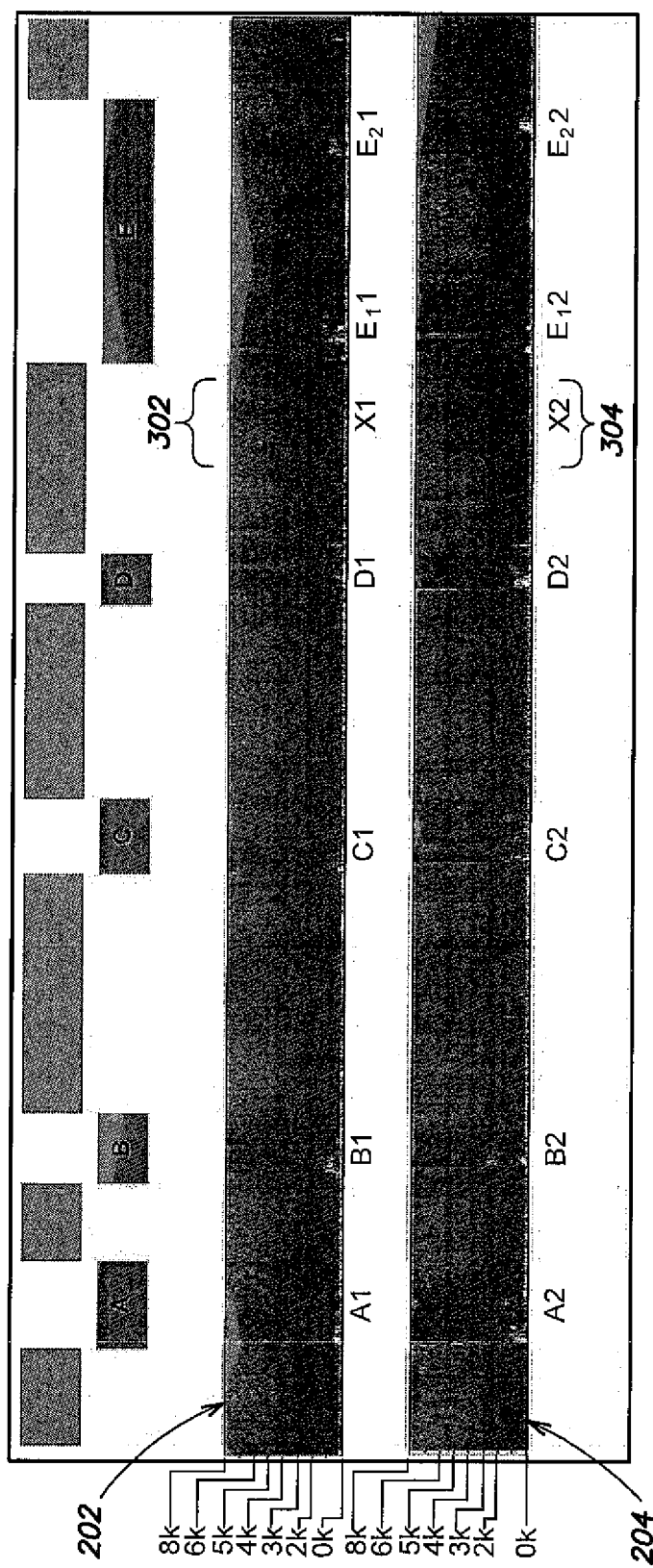
FIG. 3 is a diagrammatic illustration of a primary language audio track and an alternate language audio track indicating a region containing forced narrative.

The technique can also detect candidate regions of forced narrative dialogue, in which a portion of dialog is deliberately not dubbed into the alternate language but left in the primary language. Forced narrative dialog may enhance the dramatic impact of a scene or introduce an element of realism into a media program. For such a region, the alternate language track may require subtitles in the alternate language to convey the meaning of the dialog, since it is being spoken in the primary language. In the validation process, a distributor needs to determine whether the forced narrative is correct, i.e., that it does not represent a portion of the dub that has been inadvertently omitted. Forced narrative may be expected to appear in regions of the media program containing voice activity that fall within regions for which the alternate audio track is identical or nearly identical to the primary audio track. A candidate forced narrative region is illustrated in FIG. 3. Region X1 302 in primary language audio track 202 and corresponding region X2 304 in alternate language audio track contain voice activity and are located within a region for which the two tracks match. The list of temporal regions output by software that uses the described methods would also include the start and end times for forced narrative regions, e.g., [A1 Begin, A1 End, A2 Begin, A2 End], [B1 Begin, B1 End, B2 Begin, B2 End], . . . . [X1 Begin, X1 End, X2 Begin, X2 End], . . . . The forced narrative regions may be distinguished from the foreign language dub segments, e.g., flagged as forced narrative regions, or they may be output as a separate list. In general, the start and end times of forced narrative segments correspond exactly, since the alternate language speech is an exact duplicate of the corresponding primary language speech.

Figure 4:
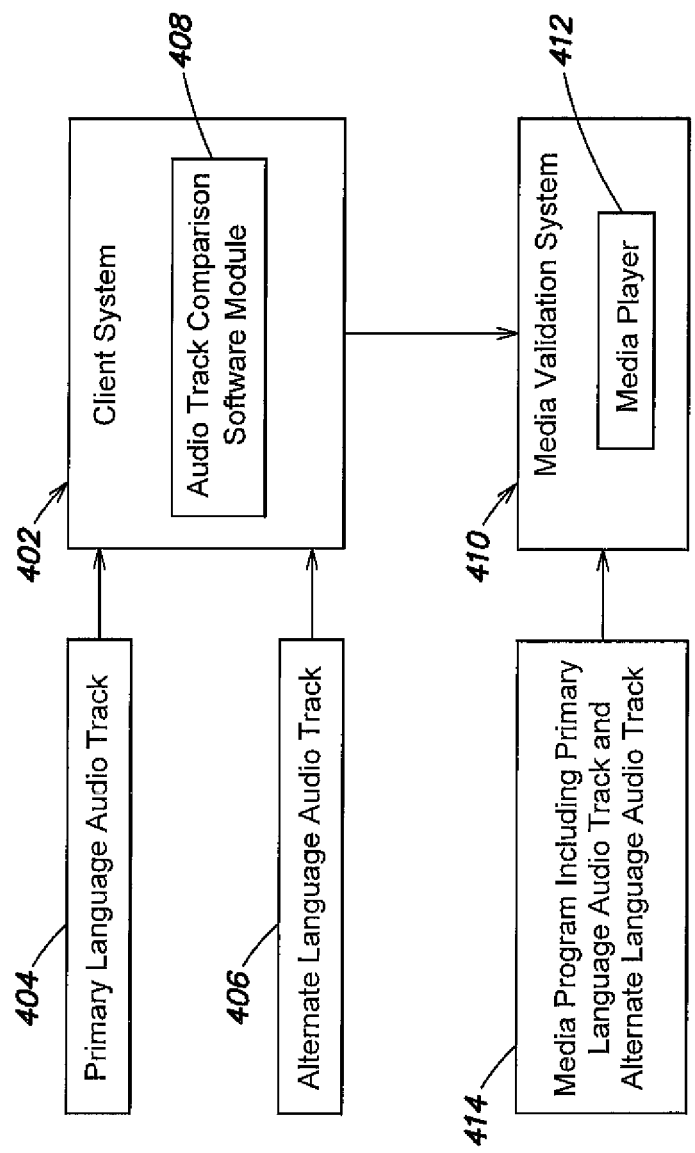
FIG. 4 is a high-level block diagram of a system for performing foreign language dub validation using the methods described herein.

FIG. 4 is a high-level block diagram of a system for performing foreign language dub validation using the methods described herein. Client system 402 receives primary language audio track 404 and alternate language audio track 406. The client system runs audio track comparison software module 408 to determine the temporal regions for which tracks 404 and 406 are similar or identical. The module takes the temporal inverse of these regions and generates a list of the start times and end times for the temporal inverse regions, as described above. The list is passed to the validation system and is either stored on local or remote storage (not shown in the figure) or sent to media validation system 410 over a local or wide area data network. The media validation system is used by a validator to perform the validation of the foreign language dubs identified in media program 414. The system runs media player 412, which is adapted to receive the list of the start times and end times for the temporal regions identified as foreign language dub regions, either directly from client system 402 as shown in the figure, or to retrieve the list from local or remote storage. The player may be programmed to play back from a specific offset time. Either automatically, or under control of the validator, the player jumps to an offset specified in the received list of regions as being a start time of one of the regions containing dubbed speech, and to start playing back from that location. Once the region has been reviewed and either validated or flagged as requiring attention, the media validation system enables the validator to skip to the start of the next region containing dubbed speech, and so on until all the regions containing dubbed speech have been reviewed. Examples of media players adapted to receive lists of offsets and provide the functionality described include a digital audio workstation, such as Pro Tools, or a media player such as Windows Media Player®.

In addition to traditional validation methods that involve a human validator, the ability to skip directly through a media program to regions that have been previously identified as containing dubbed speech facilitates the automation of the dub validation process. A software module on a media validating system may automatically analyze the audio signals in each of the previously identified dubbed speech regions by comparing the audio signals on the alternate audio track to audio signals expected from speech activity in the alternate language. To determine what is expected from speech in the alternate language, the software module may use generic properties of the speech in the alternate language, such as the presence of various phonemes or of certain spectral properties of the speech. The degree of temporal correspondence between speech activity in the alternate language track and the primary language track may also be used to assess the completeness and accuracy of the alternate language dub. Based on the level of match between the voice activity appearing on the alternate language track, and the audio signals to be expected from a correct dub in the alternate language, the system determines whether the dub is accurate, and provides a confidence score for the determination. Dubbed speech regions for which the confidence score falls above a threshold level may be deemed correct and the need for human validation may be obviated. Regions for which the confidence score falls below a threshold level may be flagged or otherwise designated as requiring review by a human validator. The threshold level of confidence may be adjusted, either by a human validator, or by the system, based in part on the statistics of the levels of match in a given media program.

The methods described above may be performed for multiple alternate language tracks for media programs that include tracks for more than one alternate. Programs that are distributed over a wide set of territories or globally may include dozens or even over a hundred alternative languages. Each of the alternate language tracks, e.g., French, Spanish, German, Chinese, etc., may be subjected to comparison with the primary language track as described above, and a list of candidate regions containing language dubbed in that language may be provided to a foreign language sub validating system.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of locating temporal regions of a time-based media program that contain dubbed speech, the method comprising:
   receiving the time-based media program, the time-based media program comprising:
      a first language audio track comprising a first plurality of temporal regions, each temporal region of the first plurality of temporal regions including speech spoken in a first language; and
      an alternate language audio track comprising a second plurality of temporal regions, each temporal region of the second plurality of temporal regions including speech spoken in an alternate language dubbed from speech in the first language within a temporally corresponding region of the first language audio track; and
   performing a comparison between the first language audio track and the alternate language audio track to locate a matching set of temporal regions defined as a set of regions for which audio content of temporally corresponding regions of the first language audio track and of the alternate language audio track differ by less than a threshold amount;
   generating a temporal inverse of the matching set of temporal regions, wherein the temporal inverse comprises temporally corresponding regions of the first language audio track and of the alternate language audio track not included within the matching set of temporal regions, and wherein an audio content of the first language audio track and an audio content of the alternate language audio track differ by more than the threshold amount; and
   determining that:
      the temporal regions of the alternate language audio track that are included within the temporal inverse differ from the first language audio track by more than the threshold amount as a result of dubbed speech contained within the alternate language audio track; and
      dubbed speech is located within the temporal regions of the alternate language audio track that are included within the temporal inverse.

2. The method of claim 1, wherein the alternate language audio track includes sound effects.

3. The method of claim 1, wherein the alternate language audio track includes music.

4. The method of claim 1, wherein the comparison between the first audio track and the alternate audio track involves performing an audio cross-correlation between the first language audio track and the alternate language audio track.

5. The method of claim 1, wherein the comparison between the first language audio track and the alternate language audio track involves comparing audio frequency spectra of the first audio track and the alternate audio track.

6. The method of claim 1 further comprising analyzing one or more of the regions that contain dubbed speech to detect voice activity and using results of the analysis to determine a start time of speech within the one or more regions.

7. The method of claim 1:
   wherein:
      the first audio track further comprises a forced narrative region comprising speech spoken in the first language; and
      the alternate language audio track further comprises a region that temporally corresponds to the forced narrative region, the region that temporally corresponds to the forced narrative region comprising speech spoken in the first language; and
   further comprising:
      locating a temporal region of the alternate language audio track that is included within the matching set of temporal regions and that contains voice activity; and
      identifying the located temporal region of the alternate language audio track as a region containing forced narrative dialog.

8. The method of claim 1, further comprising performing automatic validation of a foreign language dub of the alternate language track by:
   for each region of the temporal inverse regions of the alternate language audio track:
      comparing the audio signals of the region with the audio signals to be expected from speech activity in the alternate language; and based on a level of match between the audio signals of the region and the audio signals to be expected from speech activity in the alternate language, determining whether a dub within the region is accurate.

9. The method of claim 8, further comprising generating a level of confidence that the dub within the region is accurate based on the level of match.

10. The method of claim 9, wherein the region is flagged for review by a human validator if the level of confidence is lower than a threshold level.

11. The method of claim 9, wherein the threshold level is adjusted automatically.

12. The method of claim 11, wherein the threshold level is adjusted by a human validator.

13. A system comprising:
a memory for storing computer-readable instructions; and
a processor connected to the memory, wherein the processor, when executing the computer-readable instructions, causes the system to perform a method of locating temporal regions of a time-based media program that contain dubbed speech, the method comprising:
receiving the time-based media program, the time-based media program comprising:
a first language audio track comprising a first plurality of temporal regions, each temporal region of the first plurality of temporal regions including speech spoken in a first language; and
an alternate language audio track comprising a second plurality of temporal regions, each temporal region of the second plurality of temporal regions including speech spoken in an alternate language dubbed from speech in the first language within a temporally corresponding region of the first language audio track; and
performing a comparison between the first language audio track and the alternate language audio track to locate a matching set of temporal regions defined as a set of regions for which audio content of temporally corresponding regions of the first language audio track and of the alternate language audio track differ by less than a threshold amount;
generating a temporal inverse of the matching set of temporal regions, wherein the temporal inverse comprises temporally corresponding regions of the first language audio track and of the alternate language audio track not included within the matching set of temporal regions, and wherein an audio content of the first language audio track and an audio content of the alternate language audio track differ by more than the threshold amount; and determining that:
the temporal regions of the alternate language audio track that are included within the temporal inverse differ from the first language audio track by more than the threshold amount as a result of dubbed speech contained within the alternate language audio track; and
dubbed speech is located within the temporal regions of the alternate language audio track that are included within the temporal inverse.

14. A computer program product comprising:
a non-transitory computer-readable medium with computer program instructions encoded thereon, wherein the computer program instructions, when processed by a computer system instruct the computer system to perform a method of locating temporal regions of a time-based media program that contain dubbed speech, the method comprising:
receiving the time-based media program, the time-based media program comprising:
a first language audio track comprising a first plurality of temporal regions, each temporal region of the first plurality of temporal regions including speech spoken in a first language; and
an alternate language audio track comprising a second plurality of temporal regions, each temporal region of the second plurality of temporal regions including speech spoken in an alternate language dubbed from speech in the first language within a temporally corresponding region of the first language audio track; and
performing a comparison between the first language audio track and the alternate language audio track to locate a matching set of temporal regions defined as a set of regions for which audio content of temporally corresponding regions of the first language audio track and of the alternate language audio track differ by less than a threshold amount;
generating a temporal inverse of the matching set of temporal regions, wherein the temporal inverse comprises temporally corresponding regions of the first language audio track and of the alternate language audio track not included within the matching set of temporal regions, and wherein an audio content of the first language audio track and an audio content of the alternate language audio track differ by more than the threshold amount; and determining that:
the temporal regions of the alternate language audio track that are included within the temporal inverse differ from the first language audio track by more than the threshold amount as a result of dubbed speech contained within the alternate language audio track; and
dubbed speech is located within the temporal regions of the alternate language audio track that are included within the temporal inverse.

* * * * *